United States Patent
Shin et al.

(10) Patent No.: US 10,009,268 B2
(45) Date of Patent: Jun. 26, 2018

(54) METHOD AND APPARATUS FOR RELAYING PACKET TRANSMISSION AND UPDATING NETWORK ADDRESS INFORMATION IN COMMUNICATION SYSTEM

(71) Applicant: Samsung Electronics Co., Ltd., Gyeonggi-do (KR)

(72) Inventors: Bong-Jhin Shin, Gyeonggi-do (KR); Jae-Eun Kang, Gyeonggi-do (KR); Han-Su Kang, Seoul (KR); Sung-Il Park, Gyeonggi-do (KR); Seong-Hee Park, Seoul (KR); Chil-Youl Yang, Gyeonggi-do (KR); Myoung-Hwan Lee, Gyeonggi-do (KR); Jang-Hee Lee, Gyeonggi-do (KR); Chun-Ho Lee, Gyeonggi-do (KR); Tae-Young Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 14/590,774

(22) Filed: Jan. 6, 2015

(65) Prior Publication Data
US 2015/0195198 A1 Jul. 9, 2015

(30) Foreign Application Priority Data

Jan. 6, 2014 (KR) .................. 10-2014-0001345
Jan. 6, 2014 (KR) .................. 10-2014-0001546

(51) Int. Cl.
*H04L 12/28* (2006.01)
*H04L 12/741* (2013.01)
(Continued)

(52) U.S. Cl.
CPC .......... *H04L 45/74* (2013.01); *H04L 12/4625* (2013.01); *H04L 61/103* (2013.01);
(Continued)

(58) Field of Classification Search
CPC ... H04L 61/6009; H04L 45/74; H04L 61/103; H04L 61/6013; H04L 12/4625; H04L 61/6022; H04L 61/25
(Continued)

(56) References Cited

U.S. PATENT DOCUMENTS 6,577,630 B1    6/2003  Markwalter et al.
7,295,530 B2 *  11/2007 Chu ..................... H04L 12/462
                                                         370/315
(Continued)

FOREIGN PATENT DOCUMENTS

JP    2006050393 A    2/2006
JP    2007 194763 A   8/2007
(Continued)

OTHER PUBLICATIONS

International Search Report dated Mar. 20, 2015 in connection with International Patent Application No. PCT/KR2015/000102, 3 pages.
(Continued)

*Primary Examiner* — Man Phan

(57) ABSTRACT

A method to transmit and receive a packet in a bridge of a communication system is provided. The method includes receiving a first packet from a first network. The method also includes converting a medium access control (MAC) layer source address of the received first packet into a MAC address of the bridge. The method further includes transmitting the address-converted first packet to a node of a second network.

4 Claims, 9 Drawing Sheets

(51) Int. Cl.
  *H04L 29/12* (2006.01)
  *H04L 12/46* (2006.01)
(52) U.S. Cl.
  CPC .......... *H04L 61/25* (2013.01); *H04L 61/6009* (2013.01); *H04L 61/6013* (2013.01); *H04L 61/6022* (2013.01)
(58) Field of Classification Search
  USPC .................. 370/312–466; 455/450–525; 709/225–245
  See application file for complete search history.

(56) References Cited

U.S. PATENT DOCUMENTS

| | | | | |
|---|---|---|---|---|
| 7,379,429 | B1* | 5/2008 | Thottakkara | H04L 12/437 370/256 |
| 7,417,996 | B2* | 8/2008 | Hong | H04W 92/02 370/310.2 |
| 7,515,606 | B2* | 4/2009 | Kim | H04B 1/7163 370/315 |
| 7,634,608 | B2* | 12/2009 | Droux | H04L 49/10 709/250 |
| 7,693,152 | B2* | 4/2010 | Deng | H04L 12/4625 370/392 |
| 7,697,556 | B2* | 4/2010 | Gray | H04L 12/4625 370/389 |
| 7,894,383 | B2* | 2/2011 | Ikeda | H04L 45/00 370/328 |
| 8,001,269 | B1 | 8/2011 | Satapati et al. | |
| 8,488,486 | B2* | 7/2013 | Ikeda | H04L 45/00 370/252 |
| 8,503,396 | B2* | 8/2013 | Blanchette | H04L 45/66 370/312 |
| 8,873,530 | B2* | 10/2014 | Zhu | H04W 88/16 370/338 |
| 9,065,662 | B1* | 6/2015 | Bishara | H04L 12/18 |
| 9,264,305 | B2* | 2/2016 | Zhou | H04L 49/70 |
| 9,325,523 | B2* | 4/2016 | Wang | H04L 12/4625 |
| 2005/0013307 | A1* | 1/2005 | Park | H04L 29/12254 370/395.53 |
| 2005/0243787 | A1* | 11/2005 | Hong | H04W 92/02 370/338 |
| 2006/0184710 | A1* | 8/2006 | Valdivia | G06F 13/405 710/315 |
| 2006/0248227 | A1* | 11/2006 | Hato | H04L 12/4633 709/245 |
| 2007/0189308 | A1* | 8/2007 | Tchigevsky | H04L 12/4625 370/396 |
| 2011/0103255 | A1 | 5/2011 | Ikeda et al. | |
| 2012/0008562 | A1* | 1/2012 | Yam | H04W 36/14 370/328 |
| 2013/0016644 | A1* | 1/2013 | Yam | H04W 36/14 370/311 |
| 2013/0136131 | A1* | 5/2013 | Hirai | H04L 45/74 370/392 |
| 2013/0315146 | A1 | 11/2013 | Vangala et al. | |
| 2013/0336326 | A1 | 12/2013 | Li | |
| 2016/0308727 | A1* | 10/2016 | Rojas S Nchez | H04L 41/12 |

FOREIGN PATENT DOCUMENTS

| | | |
|---|---|---|
| JP | 2009 171133 | 7/2009 |
| KR | 2012 0127996 A | 11/2012 |
| WO | 2007129056 A2 | 11/2007 |
| WO | 2013049989 A1 | 4/2013 |

OTHER PUBLICATIONS

Written Opinion of International Searching Authority dated Mar. 20, 2015 in connection with International Patent Application No. PCT/KR2015/000102, 7 pages.
Foreign Communication from Related Counterpart Application; European Patent Application No. 15733096.0; Supplementary European Search Report dated Jun. 12, 2017; 5 pages.
Communication from a foreign patent office in a related foreign counterpart application, European Patent Office, "Supplementary European Search Report," Application No. EP 15 73 3096, dated Sep. 12, 2017, 11 pages.
The Wireshark Wiki, "Gratuitous ARP," Jan. 9, 2009, Retrieved from: https://wiki.wireshark.org/Gratuitous_ARP?action=print on [retrieved on Jan. 9, 2016], 2 pages.

* cited by examiner

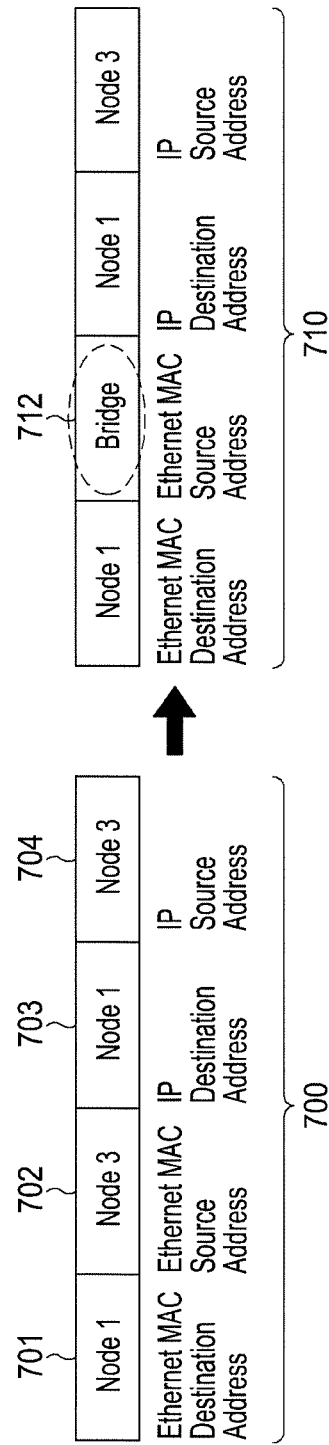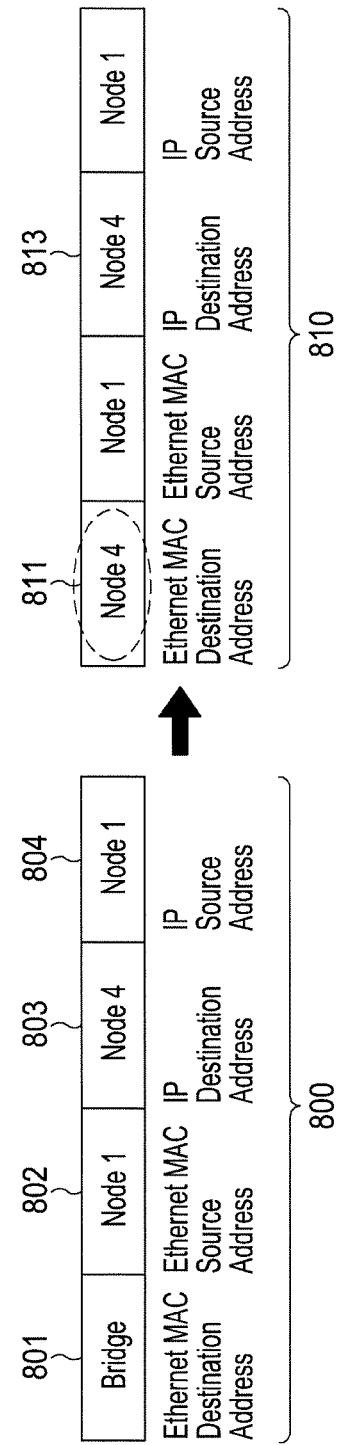

METHOD AND APPARATUS FOR RELAYING PACKET TRANSMISSION AND UPDATING NETWORK ADDRESS INFORMATION IN COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Jan. 6, 2014 and assigned Serial No. 10-2014-0001546, and a Korean patent application filed in the Korean Intellectual Property Office on Jan. 6, 2014 and assigned Serial No. 10-2014-0001345, the entire disclosure of which is incorporated herein by reference.

TECHNICAL FIELD

The present disclosure relates to a method and apparatus for relaying packet transmission or reception between different communication networks and updating network address information in a communication system.

BACKGROUND

A Wireless Local Area Network (WLAN) communication system, a communication system defined in Institute of Electrical and Electronics Engineers (IEEE) 802.11, is a Local Area Network (LAN) that allows users to enjoy high-speed Internet within a predetermined range from the spot where an Access Point (AP) is installed. Typically, the communication is performed using radio waves or infrared transmission scheme. On the other hand, Wireless Fidelity (Wi-Fi) is a term that refers to IEEE 802.11 technology in Wi-Fi Alliance, which is a non-profit organization among the WLAN manufacturers and the communication operators. Therefore, WLAN and Wi-Fi are both used as a term that refers to IEEE 802.11-based wireless technology. In the following description, "Wi-Fi/WLAN", "Wi-Fi" and "WLAN", which mean the IEEE 802.11-based wireless technology, will be interchangeably used.

As the Wi-Fi technology is installed in smart phones, smart appliances and the like, the number of devices allowing the users to enjoy Wi-Fi has increased drastically. These Wi-Fi/WLAN devices constitute their own multi-hop/mesh network, which is connected to an external network through an AP. For reference, the mesh network, which is a network in which each node exists as an independent router, performs communication through another connection even though one connection is disconnected, as the nodes are connected like a mesh.

SUMMARY

In relation to an aspect of an embodiment of the present disclosure, in order to configure the bridge that uses the Wi-Fi/WLAN interface, ACK transmission is required as follows.

The Wi-Fi/WLAN interface may not support the above-described promiscuous mode. The MAC layers used in the wired interface and the wireless interface are different in the carrier sensing scheme, and because of this difference, the promiscuous mode may not be used in the wireless bridge. Specifically, the MAC layer of the wired Ethernet uses a Carrier Sensing Multiple Access with Collision Detection (CSMA/CD) scheme, for the carrier sensing. In this scheme, each of the devices measure a power level of the wired cable to determine whether there is another device in communication, and transmit the packet if there is no another device in communication. Wire-based communication is lower than wireless-based communication in terms of transmission error probability. In addition, if a packet collides with another packet during communication, the power level is changed. Thus, it is possible to immediately recognize that the packet has collided with another packet, after packet transmission. Therefore, in the CSMA/CD scheme, there is no need to receive a response (ACK/NACK) to the packet reception from a receiver, after the packet transmission, and the Automatic Repeat Request (ARQ) technique is not required.

On the other hand, the MAC layer of Wi-Fi/WLAN uses a Carrier Sensing Multiple Access with Collision Avoidance (CSMA/CA) scheme, for the carrier sensing. In wireless-based communication, unlike in wire-based communication, the signal level varies significantly depending on the distance between devices, thus making it difficult to determine whether the packet is being transmitted, by simply measuring the power level. Therefore, in addition to the scheme of detecting collision of packets by measuring the power level, a scheme for detecting a collision state of packets is used additionally. The most commonly used scheme is the ARQ technique. In other words, if an ACK for a packet is received from a receiver after a transmitter transmits the packet, the transmitter determines that the transmission of the packet is successful, and if the transmitter fails to receive an ACK or receives a NACK, the transmitter determines that the transmission of the packet is unsuccessful.

As described above, in the promiscuous mode, the bridge receives all packets regardless of MAC addresses of the packets. If Wi-Fi/WLAN uses the promiscuous mode, the wireless bridge receives all packets regardless of MAC addresses of the packets. However, even though the wireless bridge receives all packets, the wireless bridge may not send an ACK for the packets whose MAC addresses are not the same as the MAC address of the wireless bridge. Therefore, in some cases, a device that has transmitted a packet fails to receive an ACK, so the device determines that the transmission is failed, even though a receiver has successfully received the packet. Therefore, in order to configure a bridge that uses a Wi-Fi/WLAN interface, a scheme for ACK transmission is required.

To address the above-discussed deficiencies, it is a primary object to provide a method and apparatus for relaying packet transmission or reception in a communication system. An aspect of an embodiment of the present disclosure is to provide a method and apparatus for configuring a wireless bridge in a WLAN communication system. An aspect of an embodiment of the present disclosure is to provide a method and apparatus for converting a MAC address of a packet that a wireless bridge has received, in a WLAN communication system. An aspect of an embodiment of the present disclosure is to provide a method and apparatus for implementing ARQ in a wireless bridge in a WLAN communication system.

On the other hand, in relation to another aspect of an embodiment of the present disclosure, if a wired bridge device in use is replaced with a wireless bridge device or vice versa, it is necessary to update an Address Resolution Protocol (ARP) table. Here, the ARP, which is a protocol used to change an IP address to a unique MAC address of a network device, is used to find the MAC address when the IP address of the network device is known. An address table in which mapping is made between IP addresses and MAC addresses based on the ARP is referred to as an ARP table.

Regarding the same network device, a MAC address that is registered when a wired bridge device is used for the network device is different from a MAC address that is registered when a wireless bridge device is used for the network device, and when an external network device (or node) sees a network device (or node) existing in an internal network connected to the bridge device, the MAC address is different. While the wired bridge device uses an actual MAC address of the network device, the wireless bridge device uses the MAC address of the bridge device as a MAC address of the network device. Therefore, if a wired bridge device in use is changed to a wireless bridge device or vice versa, it is necessary to update the ARP table. Accordingly, another aspect of an embodiment of the present disclosure is to provide a method and apparatus for efficiently updating a network address upon replacement (or change) in bridge device in a communication system that uses a bridge device. Another aspect of an embodiment of the present disclosure is to provide a method and apparatus for updating an ARP table upon replacement between wired/wireless bridge devices in a communication system that uses a bridge device. Another aspect of an embodiment of the present disclosure is to provide a method and apparatus for efficiently performing replacement between wired/wireless bridge devices in a network Layer 2 (L2) of a communication system that uses a bridge device.

The present disclosure provides two different aspects of an embodiment thereof. An aspect of an embodiment of the present disclosure relates to ACK transmission to configure a bridge that uses a Wi-Fi/WLAN interface.

In accordance with an aspect of an embodiment of the present disclosure, a method for transmitting and receiving a packet in a bridge of a communication system is provided. The method includes receiving a first packet from a first network. The method also includes converting a medium access control (MAC) layer source address of the received first packet into a MAC address of the bridge. The method further includes transmitting the address-converted first packet to a node of a second network.

In accordance with an aspect of an embodiment of the present disclosure, a bridge device to transmit and receive a packet in a communication system is provided. The bridge device includes a transceiver configured to receive a first packet from a first network. The bridge device also includes an address manager configured to convert a medium access control (MAC) layer source address of the received first packet into a MAC address of the bridge device, and transmit the address-converted first packet to a node of a second network through the transceiver.

Another aspect of an embodiment of the present disclosure relates to updating network address information in a communication system that uses wired or wireless bridges.

In accordance with another aspect of an embodiment of the present disclosure, a method for updating network address information in a communication system that uses a bridge is provided. The method includes, if a bridge device is replaced, obtaining an Internet Protocol (IP) address by the replaced bridge device. The method also includes transmitting, by the replaced bridge device, a packet indicating the replacement of the bridge device to an internal network node. The method further includes broadcasting, by the replaced bridge device, a message for updating the network address information to an external network node. Table information including the network address information is updated in the external network node that has received the message.

In accordance with another aspect of an embodiment of the present disclosure, a bridge device in a communication system that uses a wired or wireless bridge is provided. The bridge device includes a first network interface configured to communicate with an external network. The bridge device also includes a second network interface configured to communicate with an internal network. The bridge device further includes a medium access control (MAC) layer interface. The MAC layer interface is configured to control a bridge function of obtaining an Internet Protocol (IP) address if a bridge is changed. The MAC layer interface is also configured to transmit a packet indicating the change in bridge to a node of the internal network through the second network interface. The MAC layer interface is further configured to broadcast a message to update the network address information to an external network node through the first network interface. Table information including the network address information is updated in the external network node that has received the message.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it is advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device is implemented in hardware, firmware or software, or some combination of at least two of the same. It should be noted that the functionality associated with any particular controller is centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example MAC address of a packet delivered from an internal network to an external network converted in a wireless bridge according to this disclosure;

FIG. 8 illustrates an example MAC address of a packet delivered from an external network to an internal network converted in a wireless bridge according to this disclosure;

Throughout the drawings, like reference numerals will be understood to refer to like parts, components, and structures.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device or communication system. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In order for Wi-Fi/WLAN devices to be connected to the external network, a bridge device is required. The bridge device is generally connected to the AP through a wired communication interface that uses an Ethernet cable. The term 'bridge' refers to a function of connecting different communication networks to one network, and typically, the bridge is implemented in a Layer 2 (or Medium Access Control (MAC) layer) to connect different networks.

Figure 1:
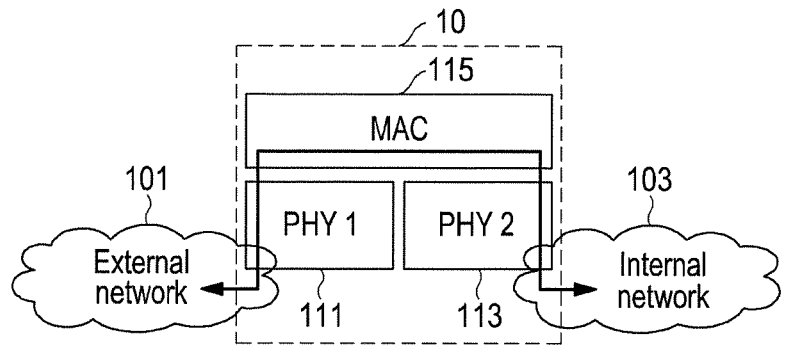
FIG. 1 illustrates an example bridge function to connect different networks through a bridge device in a general communication system according to this disclosure.

FIG. 1 illustrates an example bridge function to connect different networks through a bridge device in a general communication system according to this disclosure.

Referring to FIG. 1, a bridge device 10 includes a plurality of physical (PHY) layer interfaces 111 and 113 and a MAC layer interface 115, as its network interfaces. An external network 101 and an internal network 103 are connected to each other through the bridge device 10 in FIG. 1 as shown by reference numeral 11. The physical layer interfaces 111 and 113 are connected to the different networks 101 and 103, respectively. A packet received from one network is delivered to the bridge device 10 through its associated network interface 111 or 113, and the bridge device 10 finds a destination network of the received packet, and deliver the packet to the network interface that is connected to the found network. The bridge is classified as a "wired bridge" or a "wireless bridge" based on whether the communication interface in the direction of connecting with the external network 101 among the network interfaces constituting the bridge device 10 is a wired communication interface (such as Ethernet) or a wireless communication interface (such as Wi-Fi/WLAN).

Figure 2:
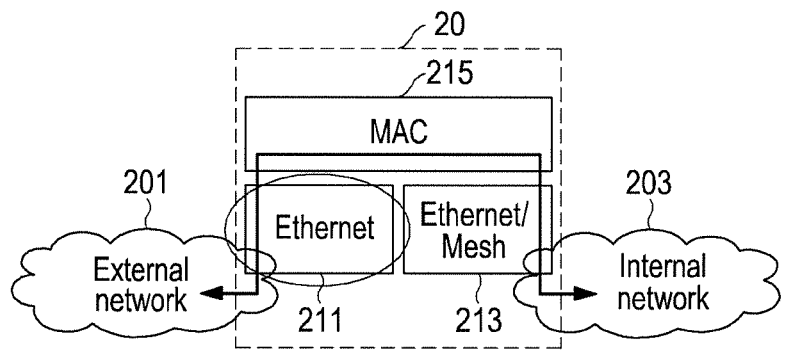
FIG. 2 illustrates an example wired bridge device in a general communication system according to this disclosure.

FIG. 2 illustrates an example wired bridge device in a general communication system according to this disclosure. Referring to FIG. 2, a wired bridge device 20 includes a plurality of physical layer interfaces 211 and 213 and a MAC layer interface 215, as its network interfaces, and is connected to an external network 201 and an internal network 203 through Ethernet interfaces 211 and 213 which are wired communication interfaces, respectively, as shown by reference numeral 21.

In the general communication system, a communication interface includes a physical layer, a MAC layer (for example, that includes a bridge), and a Transfer Control Protocol/Internet Protocol (TCP/IP) layer. A packet generated in a transmitter is delivered to the MAC layer and the TCP/IP layer through the physical layer. Each layer delivers only the packet required for the layer among the received packets, to the next layer. Specifically, the physical layer receives all the packets generated by the transmitter, and delivers the received packets to the MAC layer, and the MAC layer checks MAC addresses of the packets and deliver only the packet whose destination address is set as its MAC address, to the TCP/IP layer which is an upper layer.

In the wired bridge device 20 as shown in FIG. 2, a promiscuous mode is used during packet reception. The term 'promiscuous mode' refers to a mode in which the bridge accepts all the received packets. In other words, if the promiscuous mode is used, the MAC layer of the bridge delivers, to the bridge, all packets including not only the packet having a MAC address of the bridge, but also the packet having another MAC address other than the MAC address of the bridge. Based on the MAC addresses of the packets, the bridge device 20 delivers the packet having the MAC address of the bridge device 20 to the TCP/IP layer, and delivers the packet having another MAC address to a network corresponding to the MAC address.

Figure 3:
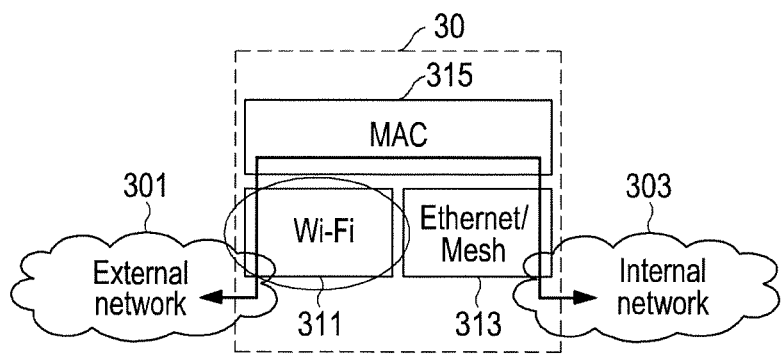
FIG. 3 illustrates an example wireless bridge device in a general communication system according to this disclosure.

FIG. 3 illustrates an example wireless bridge device in a general communication system according to this disclosure. Referring to FIG. 3, a wireless bridge device 30 includes a plurality of physical layer interfaces 311 and 313 and a MAC layer interface 315, as its network interfaces, and is connected to an external network 301 and an internal network 303 through a Wi-Fi/WLAN interface (hereinafter referred to as Wi-Fi interface) 311 which is a wireless communication interface and an Ethernet interface 313 which is a wired communication interface, respectively, as shown by reference numeral 31. The Wi-Fi interface may not support the above-described promiscuous mode. The MAC layers used in the wired communication interface and the wireless communication interface are different in the carrier sensing scheme, and because of this difference, the promiscuous mode may not be used in the wireless bridge.

A concept of an aspect of an embodiment of the present disclosure is as follows. In order for a wireless bridge to connect an internal network and an external network, the wireless bridge is made to be seen as an entity of the packet transmission, with respect to the external network.

To this end, a MAC destination address or a MAC source address of a packet is converted into (or replaced by) an address of the wireless bridge. In other words, when sending a packet generated in a node of the internal network to the external network, the wireless bridge converts a MAC source address of the packet into the address of the wireless bridge. In this case, a node of the external network recognizes all MAC addresses of the internal network as the address of the wireless bridge.

On the other hand, when the external network delivers a packet generated in the external network to the internal network, MAC destination addresses of the packets generated in an external network's node is set as the address of the wireless bridge, since the external network recognizes MAC addresses of all the internal network's nodes as the address of the wireless bridge. Therefore, in order to deliver the packets to the actual destination node, the MAC destination addresses that are set as the address of the wireless bridge is converted into an address of the actual destination node. To this end, the wireless bridge configures a table (such as an IP-MAC mapping table) for the mapping relationship between IP addresses and MAC addresses of the internal network's nodes. The IP-MAC mapping table is created using an Address Resolution Protocol (gARP) message that an internal network's node sends to an external network's node through the wireless bridge. Even after first configuring the IP-MAC mapping table, the wireless bridge updates the IP-MAC mapping table by receiving a gARP message. The IP-MAC mapping table is created and managed in the L2 layer, and is referenced in an operation related to the L2 layer including the bridge. An embodiment of the present disclosure will be described in detail below with reference to the accompanying drawings. An aspect of an embodiment of the present disclosure will be described below.

Figure 4:
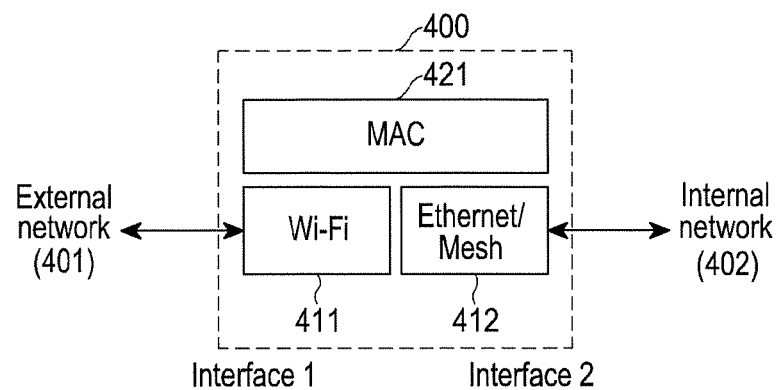
FIG. 4 illustrates a basic configuration of an example wireless bridge according to this disclosure.

FIG. 4 illustrates a basic configuration of an example wireless bridge according to this disclosure. Referring to FIG. 4, a wireless bridge 400 includes at least two physical layer interfaces 411 and 412 and one MAC layer 421. The MAC layer 421 includes a bridge function. One of the physical layer interfaces is the interface 411 for connecting with an external network 401, and the interface 411 is configured as a Wi-Fi/WLAN (hereinafter referred to as a "WLAN") device. The interface 412 to connect with an internal network 402 supports both of the wired/wireless devices. However, the interface 412 should have an Ethernet header. The Ethernet device is used as the wired device. The wireless device should be encapsulated with an Ethernet header.

Figure 5:
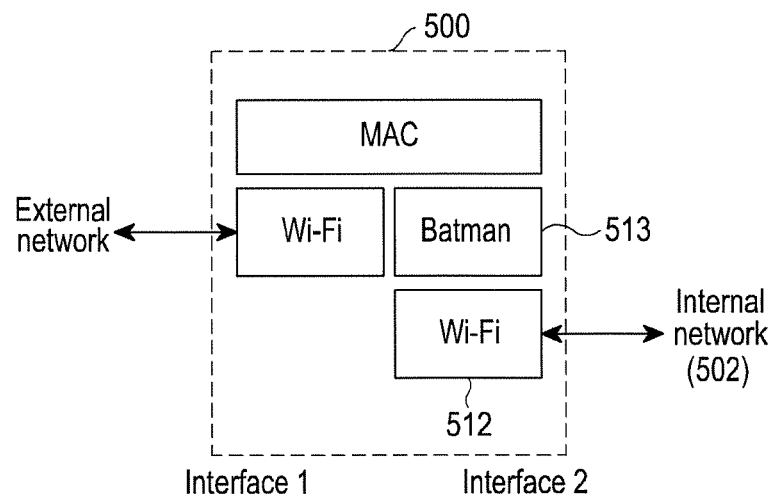
FIG. 5 illustrates an example configuration of a wireless bridge in a case where a wireless device is used as an interface to connect with an internal network according to this disclosure.

FIG. 5 illustrates an example configuration of a wireless bridge in a case where a wireless device is used as an interface to connect with an internal network according to this disclosure. In the example of FIG. 5, a bridge 500 is configured to encapsulate a WLAN 512 with an Ethernet header using a Better Approach To Mobile Ad-hoc Networking (BATMAN) module (513) when the WLAN 512 is used as an interface for connecting with an internal network 502. Other configurations are the same as those described in FIG. 4.

Figure 6:
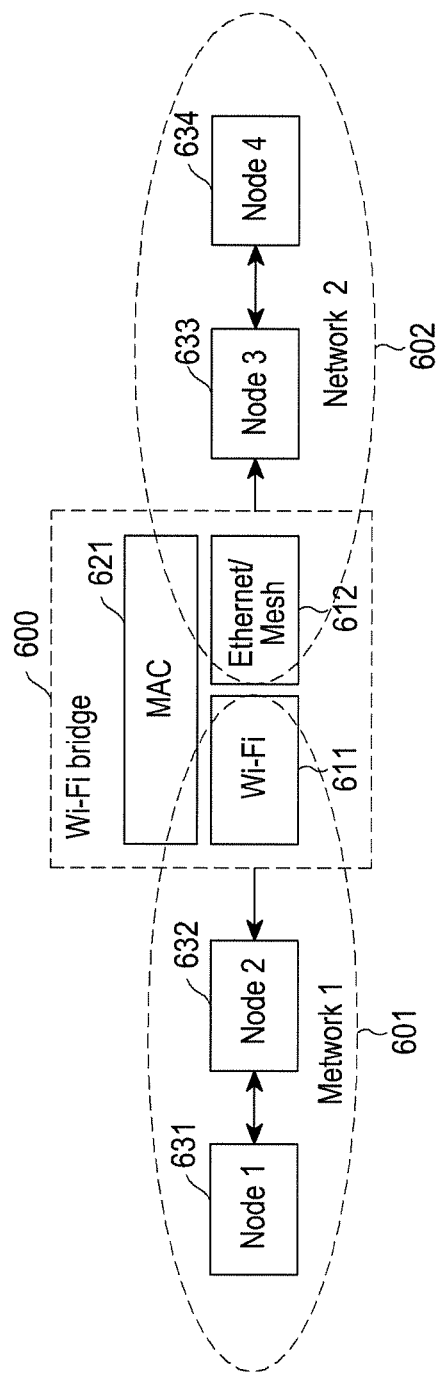
FIG. 6 illustrates an example network configured using a wireless bridge according to this disclosure.

An example operation of a wireless bridge according to this disclosure will be described below with reference to FIGS. 6, 7, and 8. FIG. 6 illustrates an example network configured using a wireless bridge according to this disclosure. Referring to FIG. 6, a wireless bridge 600, as in FIG. 4, includes a WLAN 611, which is a physical layer interface to connect with a first network 601 which is an external network, a physical layer interface 612 to connect with a second network 602 which is an internal network, and a MAC layer 621 disposed on the two physical layer interfaces 611 and 612. It is assumed that the external network 601 has two nodes 631 and 632 and the internal network also has two nodes 633 and 634. The wireless bridge 600 receives all the packets that are transmitted from one of the two networks 601 and 602, and forwards the received packets to another network. In an aspect of an embodiment of the present disclosure, when an arbitrary packet is transmitted via the wireless bridge 600, the wireless bridge 600 converts one of the MAC addresses of the packets into a MAC address of the wireless bridge 600.

First, when a packet generated in the internal network 602 is transmitted to the external network 601 via the wireless bridge 600, a MAC source address in the Ethernet MAC header of the packet is converted into a MAC address of the wireless bridge 600. If so, the nodes 631 and 632 located in the external network 601 recognizes that all the nodes 633 and 634 located in the internal network 602 have the MAC address of the wireless bridge 600. In other words, even though the nodes 631 and 632 located in the external network 601 have received a packet from the internal network 602, since the MAC source address of the received packet is the MAC address of the wireless bridge 600, the nodes 631 and 632 located in the external network 601 recognize that the packet was transmitted from the wireless bridge 600.

On the other hand, when a packet generated in the external network 601 is transmitted to the internal network 602 via the wireless bridge 600, a MAC destination address in an Ethernet header of the packet is converted from the MAC address of the wireless bridge 600 to a MAC address of an actual destination node. In the former case, when the packet generated in the internal network 602 is transmitted to the external network 601 via the wireless bridge 600, the wireless bridge 600 converts the MAC source address of the packet into the MAC address of the wireless bridge 600 as if the wireless bridge 600 generates and transmits the packet. Therefore, on the contrary, when a packet is received at the internal network 602 from the external network 601, the wireless bridge 600 converts the MAC destination address of the packet back into the MAC address of the destination node at which the packet is to be received originally. The foregoing details will be described in detail with reference to FIGS. 7 and 8.

FIG. 7 illustrates an example MAC address of a packet delivered from an internal network to an external network converted in a wireless bridge according to this disclosure. It is assumed in FIG. 7 that the source of a packet is the third node 633 of the internal network 602 and the destination thereof is the first node 631 of the external network 601. Under this assumption, reference numeral 700 represents Ethernet MAC address and IP address of a packet in the internal network 602, and reference numeral 710 represents the resulting addresses obtained by converting the addresses 700 in the wireless bridge 600. Since reference numeral 700 represents the addresses of the packet that is transmitted from the source node 633 to the destination node 631, an Ethernet MAC destination address 701 of the packet is set as the first node 631 and an Ethernet MAC source address 702 thereof is set as the third node 633. In addition, an IP destination address 703 is set as the first node 631 and an IP source address 704 is set as the third node 633. Reference numeral 710 indicates that the wireless bridge 600 has converted the Ethernet MAC source address 702 among the addresses of the packet into a MAC address 712 of the wireless bridge 600.

FIG. 8 illustrates an example MAC address of a packet delivered from an external network to an internal network converted in a wireless bridge according to this disclosure. It is assumed in FIG. 8 that the source node of a packet is the first node 631 of the external network 601 and the destination node thereof is the fourth node 634 of the internal network 602. Under this assumption, reference numeral 800 represents Ethernet MAC address and IP address of a packet in the external network 601, and reference numeral 810 represents the resulting addresses obtained by converting the addresses 800 in the wireless bridge 600.

Reference numeral 800 represents the addresses of a packet, which are given when the packet is generated in the source node 631. An Ethernet MAC destination address 801 of the packet is set as the MAC address of the wireless bridge 600, and an Ethernet MAC source address 802 thereof is set as the first node 631. In addition, an IP destination address 803 is set as the fourth node 634, and an IP source address 804 is set as the first node 631. Here, it should be noted that the Ethernet MAC destination address 801 is set as the MAC address of the wireless bridge 600. Since the wireless bridge 600 converts the MAC source address of a packet delivered from the internal network 602 to the external network 601 into the address of the wireless bridge 600 as described in FIG. 7, the nodes located in the external network 601 recognize the MAC addresses of the nodes located in the internal network 602 as the address of the wireless bridge 600. Therefore, when the nodes located in the external network 601 transmit a packet, the MAC destination address of the packet is the address of the wireless bridge 600. If the MAC address of the wireless bridge 600 is set as the MAC destination address when the nodes in the external network 601 transmit a packet to the nodes in the internal network 602, even though the wireless bridge 600 receives packets using the promiscuous mode, the wireless bridge 600 sends ACK/NACK for the packet to the source node by applying ARQ, because the MAC destination address is set as its own MAC address (such as the MAC address of the wireless bridge 600).

In order to deliver, to an actual destination node, a packet whose MAC destination address is set as the MAC address of the wireless bridge 600 as shown by reference numeral 800, the wireless bridge 600 converts the MAC destination address of the packet into a MAC address of the actual destination node for the packet. Reference numeral 810 represents the resulting address obtained by converting the MAC destination address 801 into the address 811 of the fourth node 634 which is the actual destination node. In order to convert the address of the MAC destination node into the address of the actual destination node, the wireless bridge 600 determines the actual destination node based on the IP destination addresses 803 and 813 of the packet. To this end, the wireless bridge 600 includes a mapping table between MAC addresses and IP addresses.

A description will now be made of a message transmission/reception procedure among an external network node, a wireless bridge and an internal network node during operation of the wireless bridge, and an operation of the wireless bridge according to an aspect of an embodiment of the present disclosure. As described above, in an aspect of an embodiment of the present disclosure, a MAC source address in an Ethernet MAC header of the packet that is transmitted to the external network via the wireless bridge is converted into the address of the wireless bridge. On the other hand, for the packet that is transmitted from the external network to the internal network via the bridge, a MAC destination address in an Ethernet MAC header of the packet is converted into the MAC address of the actual destination node in the wireless bridge. In order to determine the MAC address of the actual destination node, the wireless bridge generates and manages an IP-MAC mapping table in its MAC layer.

However, from the viewpoint of the external network, a node of the external network not determine the presence of the nodes located in the internal network at the time the internal network including the wireless bridge is created. On the other hand, if a node of the external network desire to communicate with an internal network node while knowing an IP address of the internal network node, the external network node should obtain an MAC address of the internal network node.

Figure 9:
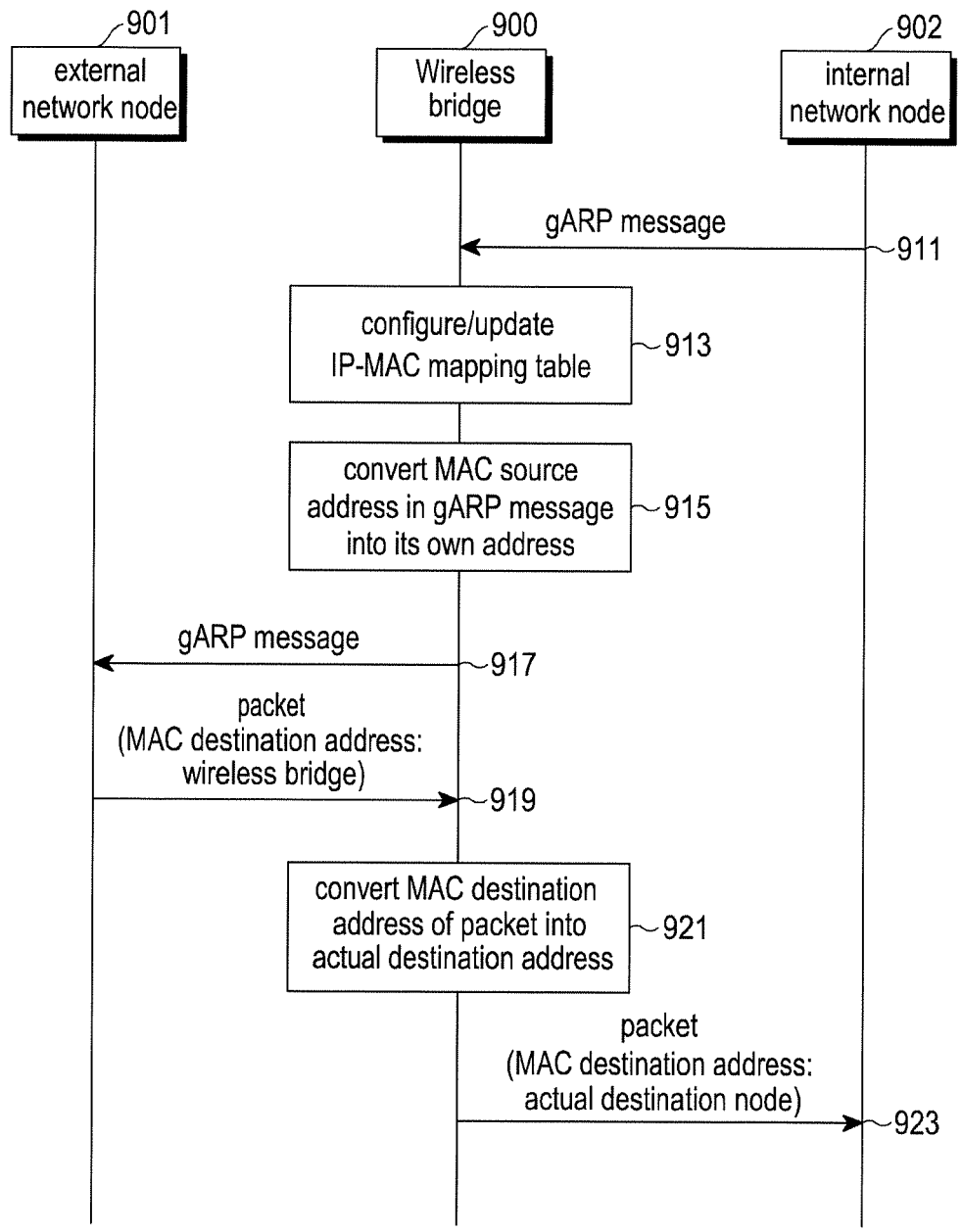
FIG. 9 illustrates an example procedure to obtain a MAC address of an internal network node by a wireless bridge and an example operation of the wireless bridge according to this disclosure.

FIG. 9 illustrates an example procedure to obtain a MAC address of an internal network node by a wireless bridge and an example operation of the wireless bridge according to this disclosure. In operation 911, an internal network node 902 sends a gARP message to notify its own IP address and MAC address, to a wireless bridge 900. In operation 913, the wireless bridge 900 configures an IP-MAC mapping table or updates the configured table using the received gARP message. However, operation 913 does not necessarily need to be performed after operation 911, and it is enough for operation 913 to be performed before operation 921 described below. In operation 915, before forwarding the gARP message to an external network node 901 using the configured or updated table, the wireless bridge 900 converts a MAC source address in the gARP message into its own address. In operation 917, the wireless bridge 900 sends the gARP message whose address is converted into the address of the wireless bridge, to the external network node 901.

In operation 919, if the external network node 901 desires to transmit an arbitrary packet to the internal network node 902, the external network node 901 sets a MAC destination address of the packet as a MAC address of the wireless bridge 900 and transmit the packet to the wireless bridge 900. In operation 921, the wireless bridge 900 converts the MAC destination address of the received packet into the actual destination address (such as the MAC address of the internal network node 902) using the IP-MAC mapping table. In operation 923, the wireless bridge 900 transmits the packet whose MAC destination address is converted, to the actual destination node.

An aspect of an embodiment of the present disclosure has been described so far. If a wireless bridge is configured according to an aspect of an embodiment of the present disclosure, an external network transmits or receives a packet using a MAC address of the wireless bridge, so the external network transmits or receives a packet even though the external network does not know a MAC address of an internal network node. In order to connect the network consisting of the existing WLAN devices to an external network, a separate device having a wired communication interface is required in addition to the WLAN devices. If a wireless bridge device according to an aspect of an embodiment of the present disclosure is used, one of the devices constituting the WLAN is used as a wireless bridge, contributing to the improvement of the convenience during configuration of the network.

Although the foregoing description has been made based on the Wi-Fi/WLAN communication system, it will be apparent to those of ordinary skill in the art that an embodiment of the present disclosure is not limited thereto, and is extended to any system for connecting a first communication network and a second communication network to replay a packet. Another aspect of an embodiment of the present disclosure will now be described. As to the main concept of another aspect of an embodiment of the present disclosure, if a wired or wireless bridge device is replaced, the replaced bridge device obtains an IP address of internal network nodes, notify the internal network nodes of the change in the bridge, and broadcast a message for updating network address information to an external network node, allowing the external network node to update the network address information.

Figure 10:
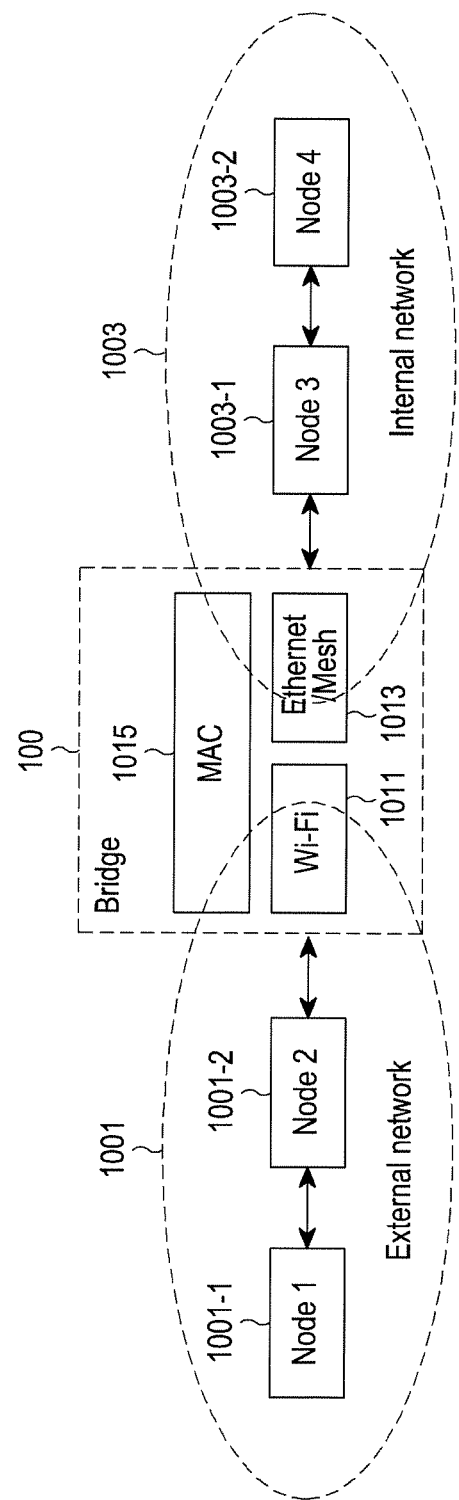
FIG. 10 illustrates an example configuration of a communication system including a bridge device according to this disclosure.

FIG. 10 illustrates an example configuration of a communication system including a bridge device according to this disclosure. Referring to FIG. 10, a bridge device 100 includes a plurality of physical layer interfaces 1011 and 1013 and one MAC layer interface 1015. The MAC layer interface 1015 performs a bridge function. A first network interface 1011 among the plurality of physical layer interfaces 1011 and 1013 is a communication interface to connect with an external network 1001, and a second network interface 1013 is a communication interface for connecting with an internal network 1003.

If the bridge device 100 in FIG. 10 is a wired bridge device, a wired interface such as an Ethernet interface is used as the first network interface 1011, and if the bridge device 100 is a wireless bridge device, a wireless interface such as a Wi-Fi interface is used as the first network interface 1011. A wired interface or a wireless interface is selectively used as the second network interface 1013 regardless of whether the bridge device 100 is a wired bridge device or a wireless bridge device. However, a packet that is delivered to the internal network 1003 via the second network interface 1013 includes an Ethernet header. Therefore, if the second network interface 1013 is a wired interface, an Ethernet interface is used as the second network interface 1013, and if the second network interface 1013 is a wireless interface, a packet that is delivered to the internal network 1003 is encapsulated to include an Ethernet header through the second network interface 1013.

Further, in FIG. 10, each of the external network 1001 and the internal network 1003 include a plurality of nodes. For convenience of description, it will be assumed that the external network 1001 includes first and second nodes 1001-1 and 1001-2, and the internal network 1003 includes third and fourth nodes 1003-1 and 1003-2. In the communication system using a wired or wireless bridge as in the example of FIG. 10, the bridge device 100 includes the first network interface 1011 to communicate with the external device 1001, the second network interface 1013 for communication with the internal network 1003, and the MAC layer interface 1015 for controlling a bridge function of obtaining an IP address upon the change (or replacement) between the wired or wireless bridges, transmitting a packet indicating the change in the bridge to a node of the internal network 1003 through the second network interface 1013, and broadcasting a message for updating network address information including an ARP table to a node of the external network 1001 through the first network interface 1011. Table information including the network address information is updated in the node of the external network 1001 that has received the message.

Figure 11:
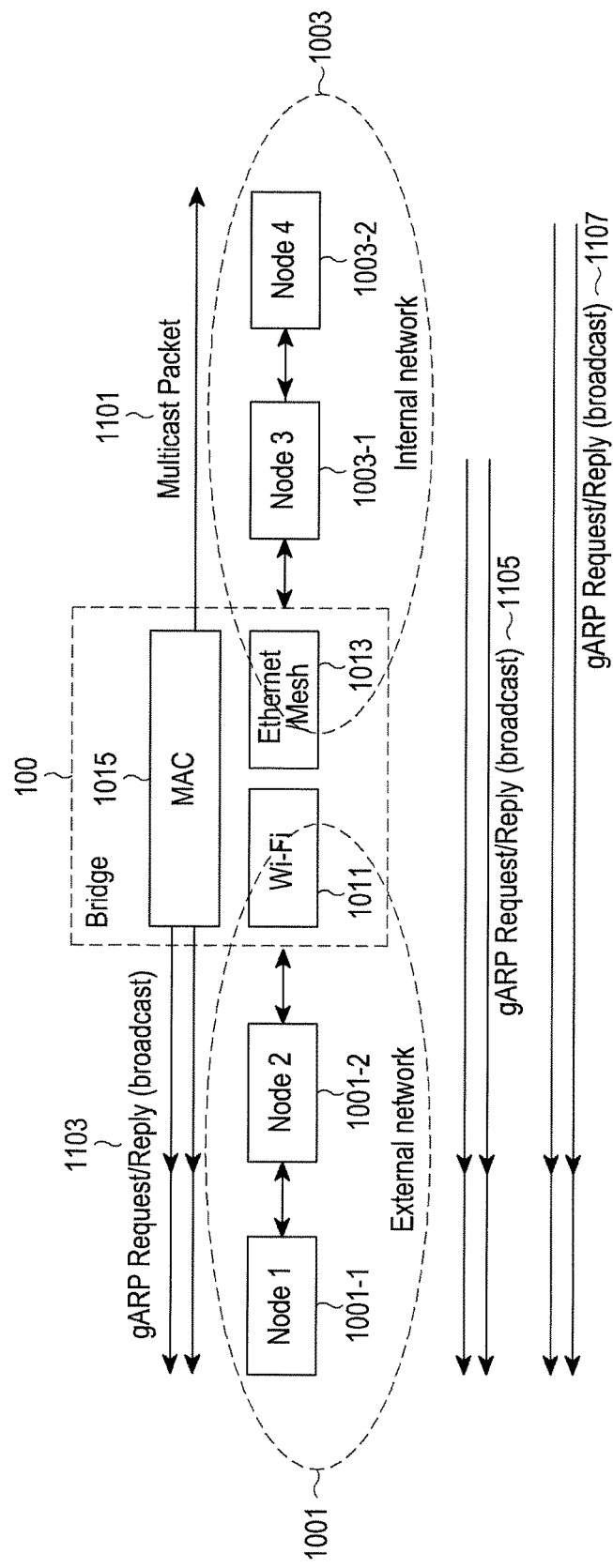
FIG. 11 illustrates an example operation of a communication system including a bridge device according to this disclosure.

FIG. 11 illustrates an example operation of a communication system including a bridge device according to this disclosure. In FIG. 11, the same reference numerals refer to the same components as those in FIG. 10. Referring to FIG. 11, when the bridge device 100 is changed from a wired bridge device to a wireless bridge device or from a wireless bridge device to a wired bridge device by, for example, the replacement of the network interface, an operation among the bridge device 100, the external network 1001 and the internal network 1003 is as follows. The bridge device 100 obtains an IP address for each of the nodes of the internal network 1003. In other words, the IP address means an IP address of the nodes of the internal network 1003 connected to the bridge device 100. A MAC address that is mapped to the IP address in the ARP table means the MAC address of the bridge device 100.

In operation 1101, upon obtaining an IP address, the bridge device 100 transmits a multicast packet to the internal network 1003 to notify the change in the bridge device 100. Further, in order to update the ARP table of the external network 1001, the bridge device 100 broadcasts a message (such as a gARP message) to the external network 1001 within a predetermined number of times. In operation 1103, a gARP request message or a gARP response message is used as the gARP message. As the gARP message, a request or response message is used, which is specified in an ARP that is a protocol used to convert an IP address into a unique MAC address of a network device.

Upon receiving the multicast packet from the bridge device 100, the third and fourth nodes 1003-1 and 1003-2 of the internal network 1003 broadcast a gARP message to the internal network 1003 within a predetermined number of times for update of the ARP table of the external network 1001, recognizing the change in the bridge device 100. In operations 1105 and 1107, a gARP request message or a gARP response message is used as the gARP message as described above.

Upon receiving the gARP message broadcasted from the internal network 1003, the first and second nodes 1001-1 and 1001-2 of the external network 1001 update the MAC address included in their own ARP table and Forwarding Data Base (FDB) table as a new MAC address. Here, the FDB table means a table for mapping a MAC address and a communication port of a destination node.

Figure 12:
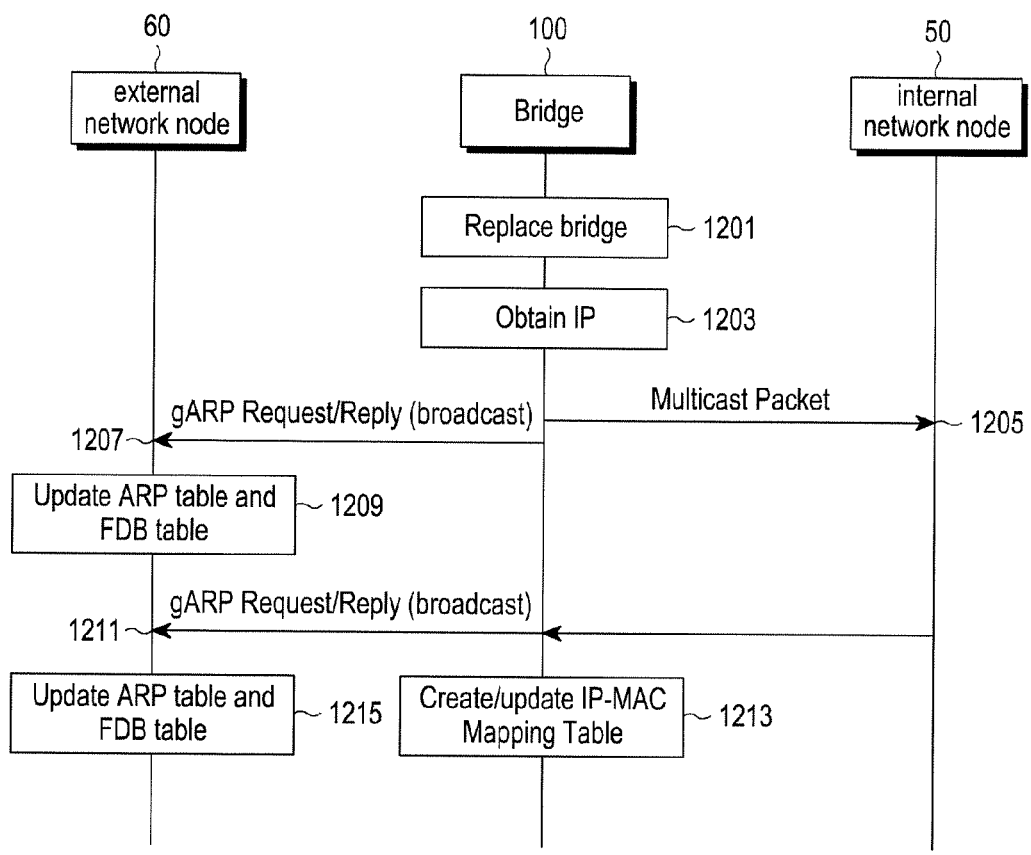
FIG. 12 illustrates an example method to update an ARP table when a bridge device is changed from a wired bridge device to a wireless bridge device according to this disclosure.

FIG. 12 illustrates an example method to update an ARP table when a bridge device is changed from a wired bridge device to a wireless bridge device according to this disclosure. Reference numeral 50 represents a node of the internal network 1003, and reference numeral 60 represents a node of the external network node 1001. Referring to FIG. 12, in operation 1201, the bridge device 100 is changed to a wireless bridge device by, for example, the replacement of the network interface. The bridge device 100 obtains an IP address in operation 1203, and transmits a multicast packet indicating the change in the bridge device 100 to the internal network node 50 in operation 1205. In operation 1207, the bridge device 100 broadcasts a gARP message to the external network node 60 within a predetermined number of times, to update an ARP table of the external network 1001. In operation 1209, upon receiving the gARP message broadcasted by the bridge device 100, the external network node 60 updates the MAC address included in its own ARP table and FDB table as a new MAC address.

In operation 1211, upon receiving the multicast packet, the internal network node 50 broadcasts a gARP message to the external network node 60 within a predetermined number of times to update the ARP table of the external network node 60, recognizing the change in the bridge device 100. In operation 1213, upon receiving the gARP message broadcasted by the internal network node 50, the bridge device 100 generates and updates a mapping table between an IP address and a MAC address. In operation 1215, upon receiving the gARP message broadcasted by the internal network node 50, the external network node 60 updates a MAC address included in its own ARP table and FDB table as a new MAC address.

Figure 13:
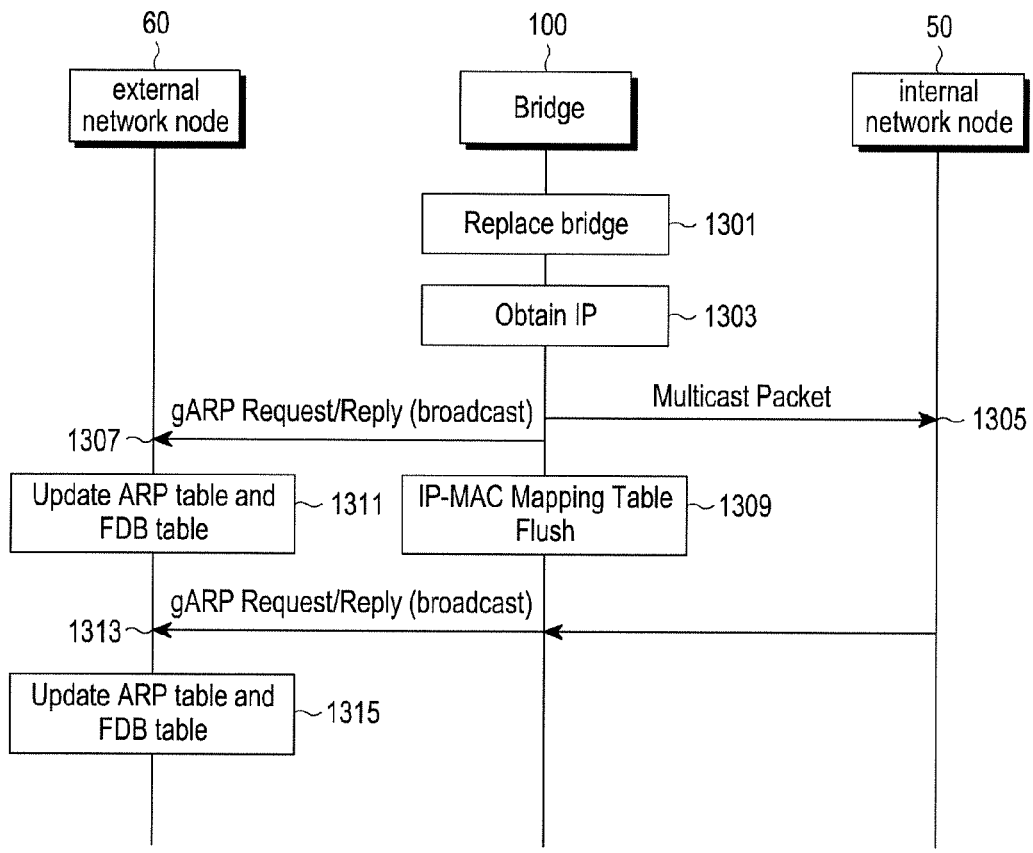
FIG. 13 illustrates an example method to update an ARP table when a bridge device is changed from a wireless bridge device to a wired bridge device according to this disclosure.

FIG. 13 illustrates an example method to update an ARP table when a bridge device is changed from a wireless bridge device to a wired bridge device according to this disclosure. Referring to FIG. 13, in operation 1301, the bridge device 100 is changed to a wired bridge device by, for example, the replacement of the network interface. The bridge device 100 obtains an IP address in operation 1303, and transmits a multicast packet indicating the change in the bridge device 100 to the internal network node 50 in operation 1305. In operation 1307, the bridge device 100 broadcasts a gARP message to the external network node 60 within a predetermined number of times, to update an ARP table of the external network 1001. Thereafter, in operation 1309, the bridge device 100 flushes and deletes the mapping table between an IP address and a MAC address that the bridge device 100 has managed. In operation 1311, upon receiving the gARP message broadcasted by the bridge device 100, the external network node 60 updates a MAC address included in its own ARP table and FDB table as a new MAC address.

In operation 1313, upon receiving the multicast packet, the internal network node 50 broadcasts a gARP message to the external network node 60 within a predetermined number of times to update the ARP table of the external network node 60, recognizing the change in the bridge device 100. In operation 1315, upon receiving the gARP message broadcasted by the internal network node 50, the external network node 60 updates a MAC address included in its own ARP table and FDB table as a new MAC address. In accordance with another aspect of an embodiment of the present disclosure, if a wired or wireless bridge is replaced in a network Layer 2 (such as if a wireless bridge device using a Wi-Fi/WLAN interface is replaced by a wired bridge device using an Ethernet interface), other nodes in the network quickly update the ARP table, making it possible to reduce the delay time that the data exchange is possible after the bridge replacement.

Figure 14:
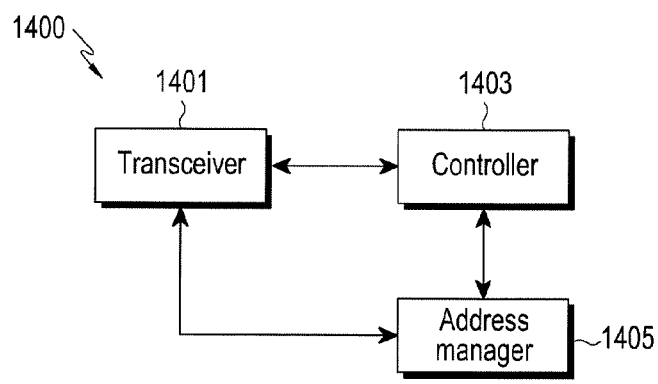
FIG. 14 illustrates an example configuration of a bridge device according to this disclosure.

FIG. 14 illustrates an example configuration of a bridge device according to this disclosure. A bridge device 1400 according to an aspect or another aspect of an embodiment of the present disclosure includes a transceiver 1401, a controller 1403 and an address manager 1405, to perform an operation according to an aspect or another aspect of an embodiment of the present disclosure. First, an operation according to an aspect of an embodiment of the present disclosure will be described. In this case, it is assumed that the bridge device 1400 is a wireless bridge.

The transceiver 1401 receives all the packets transmitted from one of the two networks 601 and 602, and delivers the received packets to the controller 1403. The controller 1403 forwards the packets to another network through the transceiver 1401. The address manager 1405 controls the MAC addresses of the packets to be forwarded, according to an aspect of an embodiment of the present disclosure. In other words, the address manager 1405 converts one of the MAC addresses of the packets into the MAC address of the wireless bridge.

First, if a packet generated in the internal network 602 is transmitted to the external network 601 through the bridge device 1400, the address manager 1405 converts a MAC source address in the Ethernet MAC header of the packet into the address of the bridge device 1400. On the other hand, if a packet generated in the external network 601 is transmitted to the internal network 602 through the bridge device 1400, the address manager 1405 converts a MAC destination address in the Ethernet MAC header of the packet into the MAC address of an actual destination node in the bridge device 1400. To this end, the address manager 1405 configures a table (such as an IP-MAC mapping table) for the mapping relationship between IP addresses and MAC addresses of the internal network nodes. The IP-MAC mapping table is created using a gARP message that an internal network node sends to an external network node through the wireless bridge 1400. Even after first configuring the IP-MAC mapping table, the address manager 1405 updates the IP-MAC mapping table by receiving a gARP message. The IP-MAC mapping table is created and managed in the L2 layer, and is referenced in an operation related to the L2 layer including the bridge.

Next, an operation according to another aspect of an embodiment of the present disclosure will be described. In this case, the bridge device 1400 is a wired bridge or a wireless bridge. Upon occurrence of a change between the wired or wireless bridges, the transceiver 1401 obtains an IP address through the first network interface 1011 to communicate with the external device 1001 and the second network interface 1013 to communicate with the internal network 1003. The obtained IP address is managed and stored in the address manager 1405. The controller 1403 controls a bridge function of transmitting a packet indicating the change in the bridge to a node of the internal network 1003 through the second network interface 1013, and broadcasting a message to update network address information including the ARP table to a node of the external network 1001 through the first network interface 1011. In terms of hierarchy, the controller 1403 corresponds to the MAC layer interface 1015. For reference, table information including the network address information is updated in the node of the external network 1001 that have received the message. This has been described in FIG. 13, so a description thereof will be omitted.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to transmit and receive a packet in a bridge of a wireless communication system, the method comprising:
   receiving a first packet transmitted from a wireless device having a medium access control (MAC) layer source address in a first network that is a wireless network, wherein the first packet has the MAC layer source address of the wireless device;
   generating an address-replaced first packet by replacing the MAC layer source address of the wireless device in the received first packet into a MAC address of the bridge;
   transmitting the address-replaced first packet to a node of a second network;
   receiving a second packet from the second network;
   generating an address-replaced second packet by replacing a MAC destination address of the second packet into a MAC address of an actual destination node of the second packet based on an internet protocol (IP) and MAC address table for the first network; and
   transmitting the address-replaced second packet to the first network.

2. The method of claim 1, further comprising:
   receiving address information of the IP and MAC from the first network; and
   configuring the IP and MAC address table for the first network using the address information.

3. A bridge device to transmit and receive a packet in a communication system, the bridge device comprising:
   a transceiver configured to receive a first packet transmitted from a wireless device having a medium access control (MAC) layer source address in a first network that is a wireless network, and to receive a second packet from a second network, wherein the first packet has the MAC layer source address of the wireless device; and
   an address manager configured to:
      generate an address-replaced first packet by replacing the MAC layer source address of the wireless device in the received first packet into a MAC address of the bridge device,
      transmit the address-replaced first packet to a node of the second network through the transceiver,
      generate an address-replaced second packet by replacing a MAC destination address of the second packet into a MAC address of an actual destination node of the second packet based on an internet protocol (IP) and MAC address table for the first network, and
      transmit the address-replaced second packet to the first network.

4. The bridge device of claim 3, wherein the transceiver is configured to receive address information of the IP and MAC from the first network, wherein the address manager configures the IP and MAC address table for the first network using the address information.

* * * * *